A. H. PHILLIPPI.
Improvement in Gas-Regulators.
No. 131,701.  Patented Sep. 24, 1872.
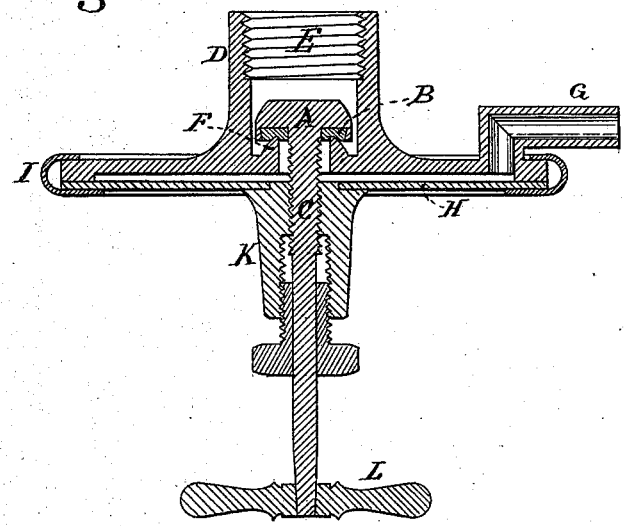
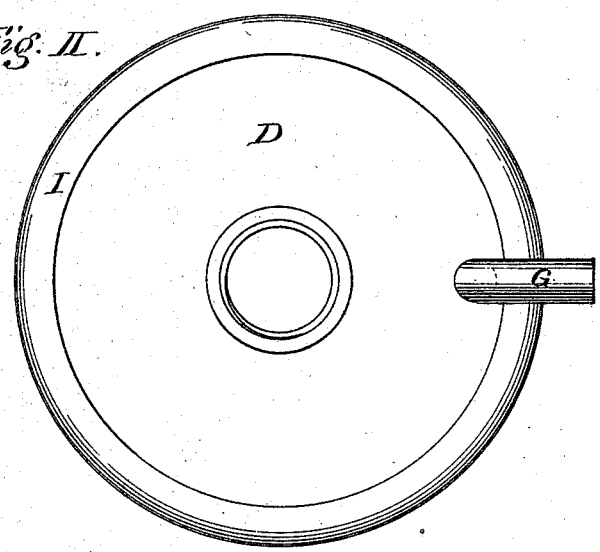
WITNESSES:
Wm Camerer
W. H. Fry
INVENTOR:
A. H. Phillippi

UNITED STATES PATENT OFFICE.

ABRAHAM H. PHILLIPPI, OF READING, PENNSYLVANIA.

IMPROVEMENT IN GAS-REGULATORS.

Specification forming part of Letters Patent No. 131,701, dated September 24, 1872.

*To all whom it may concern:*

Be it known that I, ABRAHAM H. PHILLIPPI, of Reading, in the county of Berks and State of Pennsylvania, have invented a certain Improvement in Gas-Regulators, of which the following is a specification:

My invention relates to an improved valve for the admission of the gas.

In my previous patent, dated July 31, 1860, I have shown a valve with a conical seat covered with a leather washer, which has proved itself not always reliable in practical use for the reasons given below. My improvement consists in a different valve arrangement.

Figure I represents a full section of my improved regulator. Fig. II represents a plan of the same.

A is the valve, with a dovetailed recess containing leather washer B, which is set to proper position by means of screw-threaded stem C. The casting D is attached to a receiving-pipe (not shown in drawing) by means of screw-thread E, and also contains the valve-seat F, worked to a dull knife-edge. G is the discharge-pipe. H is a plane spring-disk plate, fastened air-tight to casting D by means of an annular ring, I. Spring-disk H is attached to part K, containing a screw-thread, to correspond with thread C, for the purpose of setting valve A to its proper position, and which terminates with a threaded chamber, forming a stuffing-box to prevent leakage of gas. L is a handle to adjust the valve.

The advantages of valve-seat F, worked to a dull knife-edge, over my previous arrangement, (patented July 31, 1860,) with wide conical seat, are, first, the small area of contact, which makes it more reliable to the changes of pressures, varying from about five pounds to three hundred pounds per square inch; and second, the leather washer B, being embedded in A, is prevented from detaching itself and obstructing the passage of the gas, as has often happened with my former conical valve.

The *modus operandi* of the gas-regulator is as follows: The gas is entering from the back of the valve under varying pressures, and would blow the valve shut if it were not for the spring-plate H, to which the stem of the valve is attached by means of the screw-thread. After the valve is adjusted to deliver a desired quantity of gas, the flow or exit of the same is always uniform.

I claim as my invention—

A valve arrangement, composed of a leather embedded in a dovetail recess for one part, and an annular ring worked to a dull knife-edge on the other part, in combination with plane spring-disk, substantially as and for the purpose set forth.

ABRAHAM H. PHILLIPPI.

Witnesses:
WM. CAMERER,
W. H. FRY.